Patented Oct. 16, 1951

2,571,928

UNITED STATES PATENT OFFICE 2,571,928

RESINOUS COMPOSITIONS COMPRISING A STYRENE ISOOLEFIN COPOLYMER AND A VINYL POLYMER

Raymond G. Newberg, Cranford, N. J., assignor to Standard Oil Development Company, a corporation of Delaware No Drawing. Application November 4, 1947, Serial No. 784,071

10 Claims. (Cl. 260—45.5)

The present invention relates to improved resinous compositions and particularly to hydrocarbon resinous compositions useful especially for the packaging of oily and greasy materials as, for example, foodstuffs, and which can be readily fabricated in the form of self supporting sheets or films, molded or coated on paper, cloth or other fibers. This invention also relates to the process of preparing sheets and films.

In recent years the packaging of greasy or oily materials has become steadily more important, both for the production of food products and for other materials and new plastics have been continually developed for this type of use. Of the various more interesting resinous plastics, are certain hydrocarbon resins, specifically the copolymers of simple isoolefins such as isobutylene, with vinyl aromatics such as styrene. These hydrocarbon copolymers are quite inexpensive because of the inexpensive raw materials but they suffer from one considerable disadvantage in that they require a substantial improvement in oil and grease resistance before they can gain wide use.

The hydrocarbon copolymers referred to in the previous paragraphs are produced by the interaction or copolymerization of simple isoolefins such as isobutylene. isoamylene of from 4 to 8 carbon atoms, and the like, with vinyl aromatics such as styrene, alpha methyl styrene and alkylated styrenes at low temperatures between about —10° F. and preferably —40° to —180° F. by means of dissolved Friedel-Crafts catalysts. The comonomers may vary in proportion, the vinyl aromatics making up about 35 to 80% of the composition by weight, and the properties gradually change over the range. increasing in toughness and elasticity as the vinyl aromatic content is decreased, and increasing in brittleness and hardness as the vinyl aromatic proportion increases.

The catalysts preferred are aluminum chloride or aluminum bromide. boron fluoride, and the like, especially those dissolved in inert low freezing point. low boiling solvents such as alkyl halides, particularly ethyl or methyl chloride, as well as carbon disulfide. Aluminum bromide and the hydrocarbon complex of the Friedel-Crafts catalyst such as aluminum chloride and aluminum chloro bromide are sufficiently soluble so that they may be employed in all hydrocarbon systems, i. e. without an alkyl halide catalyst solvent.

The products can be readily handled by molding, extrusion or calendering, but as stated before, they are definitely lacking in oil and grease resistance.

It has been found that the oil and grease resistance of these products can be markedly improved without injury to the other products by the incorporation of 5 to 50% by weight, based on the mixture, of suitable polyvinyl compounds. These polyvinyl compounds are either simple polymers or copolymers such as polyvinyl chloride, polyvinyl acetate or polyvinyl ethers. Instead of polyvinyl acetate other polyvinyl esters such as propionate or butyrate can be used, or copolymers of these with each other or with polyvinyl chloride or polyvinyl ethers. The polyvinyl ethers, polyvinyl methyl ether or ethyl, propyl, butyl or secondary or isobutyl are given as examples and they may be used to make simple polymers or as copolymers as indicated before.

The vinyl polymers or copolymers employed are preferably those of molecular weights high enough to give a solid product or at least one of high viscosity.

The effect produced by the incorporation of such materials with hydrocarbon resins is wholly surprising in that it gives to the mixture attractive properties not possessed by either of the ingredients. Of the most desirable properties is a marked resistance to oil and grease and high resistance to moisture vapor passage so that the compositions are particularly useful for the packaging of food products. In addition to the above, this compounding also improves the workability of the material so that it sheets, molds. and extrudes with greater ease, producing smoother and better products.

It has been found that special techniques must be used in order to incorporate the two ingredients and that ordinary dry milling is usually not satisfactory to produce homogeneous dispersions. On the contrary, however, this can be accomplished if the polyvinyl compound is dissolved in a suitable solvent to form a viscous solution and this solution is then incorporated thoroughly into the hydrocarbon resin. This can be accomplished on a hot mill, for example. at a temperature suitably high so as to permit evaporation of the solvent which leaves the solid ingredients to all intent homogeneously dispersed, the one in the other.

Suitable solvents for the polyvinyl compounds will be readily appreciated by those skilled in the art. The low boiling (below 120° C.) esters, such as ethyl, propyl and the butyl acetates, propionates and butyrates may be used. Instead of the ester solvents, ketones may also be used such as acetone. methyl ethyl ketone, diethyl ketone, dipropyl ketone and the like. With the different vinyl compounds, one or the other of the solvents mentioned or equivalents thereof may be preferable, but in any case it is desired to use a solvent which may be evaporated at the temperature of the mill, that is below about 300° F. The composition has been described as homogeneous but there is some evidence that homogeneity is not complete. There is often a slight blushing and an opacity on submitting to strain, so that it is believed that the two compounds may not be actually physically dissolved, but in any case the dispersion is substantially uniform at least to appearances, and the material so acts after it has been thoroughly compounded.

Solvents of the above type are removable on the mill but it has been found that certain other solvents can be used which are not volatile and will remain in the final composition. When employing this type of solvent, it is important to employ one which is truly involatile so that it will not be lost and the composition will not change with time. The best solvent contemplated here is a copolymer produced by the copolymerization of a diolefin, preferably conjugated, such as butadiene, isoprene and piperylene, with an unsaturated nitrile such as acrylonitrile or methacrylonitrile. The preparation of this copolymer may be carried out according to the disclosure in applicant's copending application, Serial No. 676,120, filed June 11, 1946 now U. S. Patent Number 2,552,904. The copolymer may be a viscous liquid having a molecular weight from 30,000 to 15,000, or it may be a solid, rubbery material having a Mooney viscosity determined at 212° F. of 40–175. In using the solid solvent, it is preferable to incorporate it, first, into the vinyl compound, for example polyvinyl chloride or its equivalents, and then to incorporate this mixture into the hydrocarbon resin. The amount of the solid solvent may be from 10% to 60% by weight of the final blend, but preferably 20% to 30%.

Other solvents intermediate between the involatile and volatile types include the high boiling esters such as diethyl, dibutyl, dipropyl phthalates, succinates, sebacates, etc. These latter solvents may be used advantageously since they improve flexibility characteristics very markedly as well as promote homogeneous blends acting as mutual solvents.

When prepared as above the mixtures are thermoplastic, can be molded in the manner usual with such materials, and they can be calendered directly on paper, cloth and other materials. They have excellent mechanical properties such as tensile strength, softening point and the like.

The present compositions are usually opaque, white to colorless, and if desired may be loaded with various fillers and colored with dyes, as desired. They are not only extremely resistant to water vapor, grease and oil, but are very stable and will retain these desirable properties for a long time, not drying or becoming brittle or losing their attractive appearance.

Example I 90 grams of a mixed polymer (solid polyvinyl acetate-polyvinyl chloride) were dissolved in 360 grams of butyl acetate to form a viscous solution. 150 grams of a copolymer of isobutylene and styrene having an intrinsic viscosity above 0.80 and containing 60% by weight of styrene were placed on a rubber mill and a viscous solution was gradually worked up. The heat developed by the milling was sufficient to evaporate the solvent leaving the two ingredients thoroughly incorporated and to all appearances as a homogeneous mixture. The material was thermoplastic, calendered readily and molded quite satisfactorily.

In order to test the properties of this composition and to show its superiority over the unblended hydrocarbon copolymer, the following tests were employed. The tensile strength of the unblended, hydrocarbon resin was found to be 1,520 pounds per square inch while the blended composition had a tensile strength of 2,030 pounds per square inch. In addition no effect was noted on heat softening point. Small molded samples, weighing 10 grams, were exposed for seven days to oleic acid and similar samples were exposed to the action of a hydrogenated cooking fat. The loss of weight of the samples and the general appearance are recorded in the table below:

|  | Uncompounded Polymer | Improved Copolymer Composition |
|---|---|---|
| *Oleic Acid* | | |
| Per Cent Loss of Weight (7 days) | 74.1 | 2.2. |
| Appearance | Very poor | Very good. |
| *Cooking Fat* | | |
| Per Cent Loss of Weight (7 days) | 27.4 | 2.7. |
| Appearance | Very poor, disintegrated. | Very good. No difference in appearance. |

Example II

In this example 45 grams of a solid polyvinyl chloride were dissolved in methyl ethyl ketone to form a very viscous solution and this was worked into 150 grams of a hydrocarbon resin similar to that employed in Example I, on a mill, allowing the solvent to escape by evaporation. The composition appeared to be homogeneous, calendered to a smooth self-supporting film and could be molded quite satisfactorily.

The tensile strength of the hydrocarbon polymer alone was 1,500 pounds per square inch, the blended composition 1,480. Oil and grease resistance was tested as in the previous example with the following results:

|  | Uncompounded Polymer | Improved Copolymer Composition |
|---|---|---|
| *Oleic Acid* | | |
| Per Cent Loss of weight | 74.1 | 3.6. |
| Appearance | Very poor, disintegrated | Very good. |
| *Cooking Fat* | | |
| Per Cent Loss of weight | 27.4 | 5.2. |
| Appearance | Very poor | Very good. |
| Heat Softening Point | 55° C | 55° C. |

Example III 45 grams of solid copolymers of butadiene-acrylonitrile having a Mooney viscosity of 60 were milled thoroughly to incorporate it with 55 grams of solid polyvinyl chloride-polyvinyl acetate copolymer at temperatures ranging from 225 to 250° F. 40 grams of this thoroughly incorporated mixture were then milled into 60 grams of a copolymer of isobutylene and styrene, made according to the previous examples but containing 50% by weight of styrene in this case. The material appeared to be homogeneous, showing but little blushing on stressing. It had a tensile strength above 2,000 pounds per square inch and elongation above 200%, good oil and grease resistance, and it could be readily molded, sheeted or extruded. It also had marked resistance to the passage of moisture vapor.

Example IV 45 grams of solid polyvinyl chloride were dissolved in methyl ethyl ketone using the minimum quantity of the solvent. 150 gr. of a styrene-isobutylene resin containing 60% styrene was placed in the rubber mill at 300° F. and the viscous solution gradually milled in. During milling the ketone solvent evaporated and a homogeneous solution was recovered. This was excellently blended and could be molded, extruded, and calendered easily. The product had good tensile strength, elongation and tear resistance.

Example V 45 grams of an oily copolymer of butadiene and acrylonitrile was milled with 55 gr. of a mixture of polyvinyl chloride and polyvinyl acetate (10%) at 250° F. These materials were readily compatible. 40 gr. of this mixture was then admixed with the hydrocarbon copolymer (50% styrene and 50% isobutylene) at 250° F. These mixtures were compatible giving a product having tensile strength about 2000#/sq. in., elongation of 200%, good oil resistance and flexibility.

Example VI

The following formula was compounded in a mill at 270° F.:

| | Parts |
|---|---|
| Hydrocarbon resin (50% styrene, 50% isobutylene) | 50 |
| Polyvinyl chloride (solid)-5% polyvinyl acetate | 33 |
| Copolymer butadiene and acrylonitrile | 16.5 |
| Stearic acid | .25 |
| Basic lead carbonate | .75 |

Calendered films had a tensile strength of 1500 lbs./sq. in. elongation above 200% and good tear strength. Processability was excellent.

Example VII

The following formula was mixed on a mill at 270° F.:

| | Parts |
|---|---|
| Hydrocarbon copolymer (50% styrene) | 50 |
| Polyvinyl chloride | 33 |
| Dioctyl phthalate | 16.5 |
| Stearic acid | .25 |
| Basic lead carbonate | .75 |

This material molded and extruded well and had good physical properties.

I claim:

1. Composition of matter comprising a homogeneous dispersion of a copolymer of styrene and an isoolefin of 4 to 8 carbon atoms, a solid vinyl polymer and a copolymer of a butadiene and an acrylonitrile.

2. Composition according to claim 1 in which the first mentioned ingredient comprises from 85-30%, the second from 5 to 30%, and the last noted from 10 to 35% by weight.

3. Composition according to claim 2 in which the latter two ingredients are solid substances.

4. Process for compounding resinous hydrocarbon copolymers of isoolefins and vinyl benzenes with difficulty miscible solid polyvinyl compounds which comprises dissolving the said polyvinyl compound in an appropriate solvent to give a viscous solution, then incorporating the same into the hydrocarbon copolymer by mechanical working at temperature permitting evaporation of the solvent whereby the solid ingredients are left in a homogeneous dispersion.

5. Process according to claim 4 in which an ester solvent is employed.

6. Process according to claim 4 in which a ketone solvent is employed.

7. Process for compounding resinous copolymers of isoolefins and styrenes with difficulty miscible solid polyvinyl compounds which comprises dissolving the said polyvinyl compound in an appropriate involatile solvent to give complete solution, then incorporating the same into the hydrocarbon copolymer by mechanical working at temperatures above the heat softening point of the hydrocarbon copolymer whereby the ingredients are incorporated into a plastic composition of a pronounced oil and grease resistance.

8. Process according to claim 7 in which a solvent boiling above 200° C. or 400° F. is employed.

9. Process according to claim 7 in which a liquid copolymer of butadiene and acrylonitrile is employed.

10. A composition of matter comprising a homogeneous dispersion of a copolymer of styrene and an isoolefin of 4 to 8 carbon atoms, a solid vinyl polymer and a non-volatile solvent for the vinyl polymer.

RAYMOND G. NEWBERG.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,468,534 | Young et al. | Apr. 26, 1949 |

OTHER REFERENCES

"Vinylite Resins," Carbide and Carbon Chemicals Corporation, 1942, New York, page 4.